United States Patent
Araki

(10) Patent No.: US 7,710,672 B2
(45) Date of Patent: May 4, 2010

(54) MAGNETIC TRANSFER HOLDER UNIT, TRANSFER APPARATUS, METHOD OF MANUFACTURING A TRANSFER MEDIUM, AND MAGNETIC RECORDING MEDIUM

(75) Inventor: Minoru Araki, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 461 days.

(21) Appl. No.: 11/662,473

(22) PCT Filed: Sep. 12, 2005

(86) PCT No.: PCT/JP2005/017213

§ 371 (c)(1),
(2), (4) Date: Mar. 12, 2007

(87) PCT Pub. No.: WO2006/030928

PCT Pub. Date: Mar. 23, 2006

(65) Prior Publication Data

US 2008/0068736 A1 Mar. 20, 2008

(30) Foreign Application Priority Data

Sep. 15, 2004 (JP) ............................. 2004-268570

(51) Int. Cl.
*G11B 5/86* (2006.01)
(52) U.S. Cl. .................. 360/16; 360/15; 360/17
(58) Field of Classification Search .................. None
See application file for complete search history.

(56) References Cited

U.S. PATENT DOCUMENTS

| | | | |
|---|---|---|---|
| 6,347,016 B1 * | 2/2002 | Ishida et al. | 360/17 |
| 6,611,388 B1 | 8/2003 | Miyata et al. | |
| 6,839,192 B2 * | 1/2005 | Kamatani | 360/17 |
| 7,079,336 B2 * | 7/2006 | Kamatani et al. | 360/17 |
| 7,119,973 B2 * | 10/2006 | Kamatani | 360/17 |
| 2001/0055167 A1 * | 12/2001 | Matsuda et al. | 360/16 |
| 2002/0030909 A1 | 3/2002 | Aoki et al. | |
| 2002/0075582 A1 * | 6/2002 | Takano | 360/17 |
| 2002/0167744 A1 * | 11/2002 | Kamatani et al. | 360/17 |
| 2003/0174425 A1 * | 9/2003 | Kamatani | 360/15 |
| 2004/0040668 A1 * | 3/2004 | Kamatani | 156/540 |
| 2004/0109252 A1 * | 6/2004 | Hashi et al. | 360/17 |
| 2004/0114264 A1 * | 6/2004 | Nishikawa | 360/16 |
| 2004/0190170 A1 | 9/2004 | Kamatani | |
| 2005/0083597 A1 * | 4/2005 | Gauzner et al. | 360/17 |
| 2005/0122606 A1 * | 6/2005 | Kamatani | 360/17 |

FOREIGN PATENT DOCUMENTS

| | | |
|---|---|---|
| EP | 1 463 039 A2 | 9/2004 |
| JP | 07-78337 A | 3/1995 |
| JP | 11-273069 A | 10/1999 |
| JP | 2002-163823 A | 6/2002 |
| JP | 2003-233905 A | 8/2003 |
| JP | 2004-86995 A | 3/2004 |
| JP | 2004-87099 A | 3/2004 |

* cited by examiner

*Primary Examiner*—Dismery E Mercedes
(74) *Attorney, Agent, or Firm*—Sughrue Mion, PLLC

(57) ABSTRACT

A holder unit for use in a transfer apparatus that causes a surface of a transfer master and a surface of a slave medium to be in direct contact with each other and transfers information on the transfer master surface to the slave medium surface. The holder unit includes a pair of gripping members, movable toward and away from each other, for holding the transfer master. The transfer master is stuck firmly on either or both of the pair of gripping members through or without an elastic member.

10 Claims, 3 Drawing Sheets

TRACK DIRECTION ← Hin

MAGNETIC TRANSFER HOLDER UNIT, TRANSFER APPARATUS, METHOD OF MANUFACTURING A TRANSFER MEDIUM, AND MAGNETIC RECORDING MEDIUM

FIELD OF THE INVENTION

The present invention relates to a magnetic transfer holder unit, a transfer apparatus, a method of manufacturing a transfer medium, and a magnetic recording medium.

BACKGROUND OF THE INVENTION

As a technique for manufacturing a magnetic recording medium, there is a technique of employing a transfer master which has a predetermined land/groove pattern on a surface and in which at least the surface is magnetized, to magnetically transfer the information corresponding to the land/groove pattern of the transfer master to a slave medium.

Conventional magnetic transfer is disclosed in Japanese Unexamined Patent Publication No. 2002-163823 by way of example. The magnetic transfer is performed by employing a pair of gripping members having a mechanism for holding a transfer master by air suction, applying a magnetic field to the transfer master and a slave medium gripped by the gripping members, and rotating the gripping members to apply the magnetic field to the transfer master and slave medium in a predetermined direction.

In the aforementioned conventional technique, a magnetic field is applied to the transfer master and the slave medium through the gripping members. Particularly, in the case of manufacturing magnetic recording media of relatively small diameters, it is preferable to make the gripping members as thin as possible and move magnetic field application means as close as possible to the transfer master and the slave medium, in order to apply a magnetic field satisfactorily to the transfer master and the slave medium.

However, in the aforementioned conventional technique, the gripping members are equipped with the mechanism for holding the transfer master by air suction, so there is a limit to the thinning of the gripping members.

Meanwhile, in magnetic transfer, a microscopic magnetic pattern is transferred with a transfer master and a slave medium held in nearly direct contact with each other, so the flatness and thickness of the transfer master and the slave medium are required to be maintained with a high degree of accuracy. This leads to high costs of the transfer apparatus and the magnetic recording medium.

SUMMARY OF THE INVENTION

The present invention has been made in view of the circumstances described above. Accordingly, it is an object of the present invention to achieve the thinning of members for gripping a transfer master and a slave medium. Another object is to provide a transfer-medium manufacturing technique capable of achieving a reduction in the costs of a transfer apparatus and a transfer medium (a magnetic recording medium, etc.). Still another object is to provide a magnetic recording medium manufactured by the manufacturing technique.

The inventors have made various investigations with respect to a mechanism causing the aforementioned drawbacks and invented the following holder unit, transfer apparatus, method of manufacturing a transfer medium, and magnetic recording medium. The present invention is not to be limited to magnetic transfer, but can be applied to any arbitrary transfer. In the following description, a "slave medium" is a medium before transfer and a "transfer medium" is a medium after transfer.

A holder unit of the present invention is a holder unit for use in a transfer apparatus that causes a surface of a transfer master and a surface of a slave medium to be in direct contact with each other and transfers information on the transfer master surface to the slave medium surface. The holder unit includes a pair of gripping members, movable toward and away from each other, for holding the transfer master. The transfer master is stuck firmly on either or both of the pair of gripping members through or without an elastic member.

The present invention is applicable to both one-side transfer and double-side transfer. In the case of one-side transfer, the transfer master is stuck firmly on one of a pair of gripping members, and in the case of double-side transfer, the transfer master is stuck firmly on the two gripping members.

It is preferable that the holder unit of the present invention further include a pair of holding members for respectively holding the pair of gripping members detachably. In this case, it is further preferable that the holder unit further include a pair of holding bases for respectively holding the pair of holding members detachably.

In the case where the holder unit of the present invention is used for magnetic transfer, the aforementioned pair of gripping members and/or the aforementioned pair of holding members are preferably provided with magnetic field application means inserting portions into which at least one portion of magnetic field application means is inserted to apply a magnetic field to the transfer master and the slave medium.

A transfer apparatus of the present invention includes the aforementioned holder unit. It is preferred that the transfer apparatus further include positional adjustment mechanism for adjusting the positional relationship between the pair of gripping members.

A manufacturing method of the present invention preferably manufactures a transfer medium by use of the aforementioned transfer apparatus and comprises the steps of holding the transfer master by the pair of gripping members; adjusting the positional relationship between the pair of gripping members; and performing transfer.

A magnetic recording medium of the present invention is manufactured by use of the manufacturing method of the present invention.

The present invention is constructed such that the transfer master is stuck firmly on a pair of gripping members for holding the transfer master, so the gripping members can be made thinner compared with the aforementioned conventional technique. In addition, the degree of plane parallelization and plane smoothness of the transfer master and the slave medium can be corrected to some degree by an adhesive material with which the transfer master is stuck on the gripping members, so the accuracy of the flatness and thickness of the transfer master and the slave medium is not so strict as in the aforementioned conventional technique, and a reduction in the costs of the transfer apparatus and the transfer medium can be achieved.

BRIEF DESCRIPTION OF THE DRAWINGS

FIG. 4, which includes

PREFERRED EMBODIMENTS OF THE INVENTION

Now, an embodiment of the present invention for double-side magnetic transfer will be described with reference to the drawings. In each figure, there are cases where components not actually existing in the cross section are shown for purposes of making visual recognition easier.

Magnetic Transfer Holder Unit and Transfer Apparatus

Figure 1:
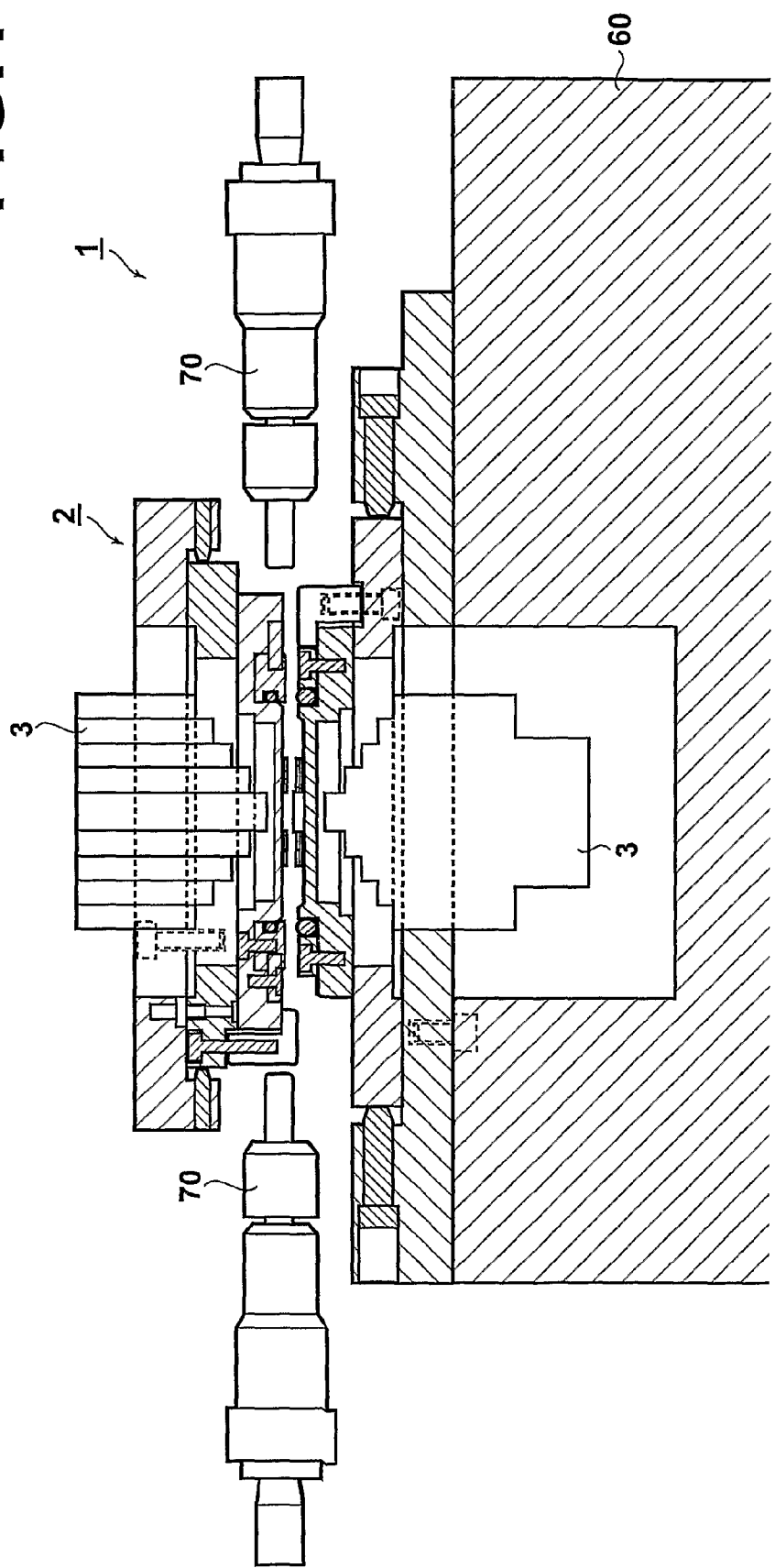
FIG. 1 is a general view showing a transfer apparatus constructed in accordance with an embodiment of the present invention.
Figure 2:
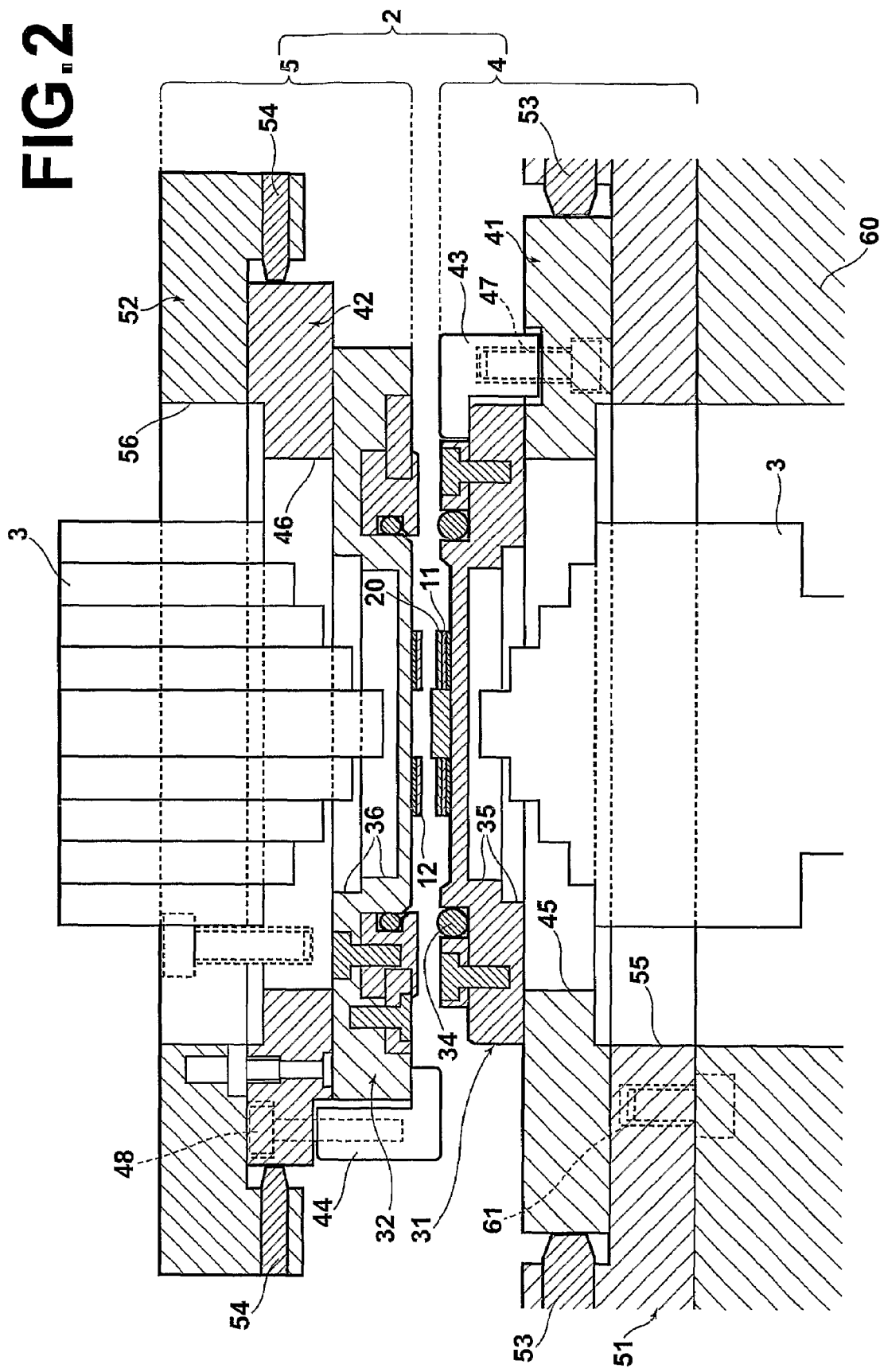
FIG. 2 is a diagram showing a magnetic transfer holder unit constructed in accordance with the embodiment of the present invention.
Figure 3:
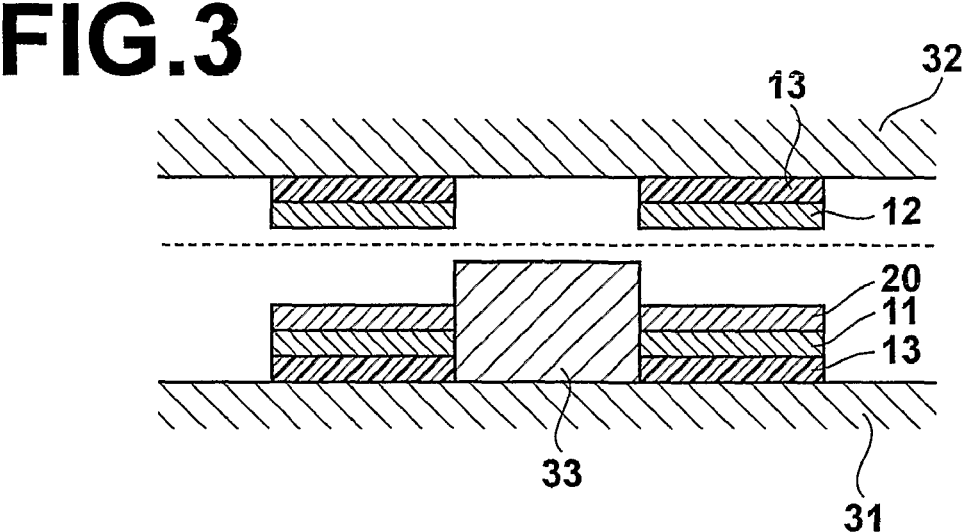
FIG. 3 is an enlarged view illustrating the essential parts of the transfer holder unit of FIG. 2.

Initially, a magnetic transfer holder unit and a transfer apparatus equipped with that unit will be described according to an embodiment of the present invention. FIG. 1 is a general view of the transfer apparatus, FIG. 2 is an enlarged view of the magnetic transfer holder unit, FIG. 3 is an enlarged view illustrating the essential parts of the transfer holder unit of FIG. 2, and FIG. 4 is a diagram showing the principle of magnetic transfer. These figures are also sectional views in the thickness direction.

As shown in FIG. 3, the transfer apparatus 1 of this embodiment causes transfer masters 11, 12 and both sides of a slave medium 20 to be in direct contact with one another and transfers the information on the surfaces of the transfer masters 11, 12 to both sides of the slave medium 20.

As shown in FIG. 1, the transfer apparatus 1 comprises two major components: a magnetic transfer holder unit 2 (hereinafter referred to simply as "holder unit 2") for holding the transfer masters 11, 12 and slave medium 20; and magnetic field application means 3 for applying a magnetic field to the transfer masters 11, 12 and slave medium 20 held by the holder unit 2.

The transfer masters 11, 12 and slave medium 20 are in the form of disks having holes in their central portions. The surfaces and sectional structures thereof are suitably selected and designed according to the magnetic recording medium to be manufactured.

Figure 4A:
FIGS. 4A and 4B, is a diagram showing the principle of magnetic transfer.
Figure 4B:
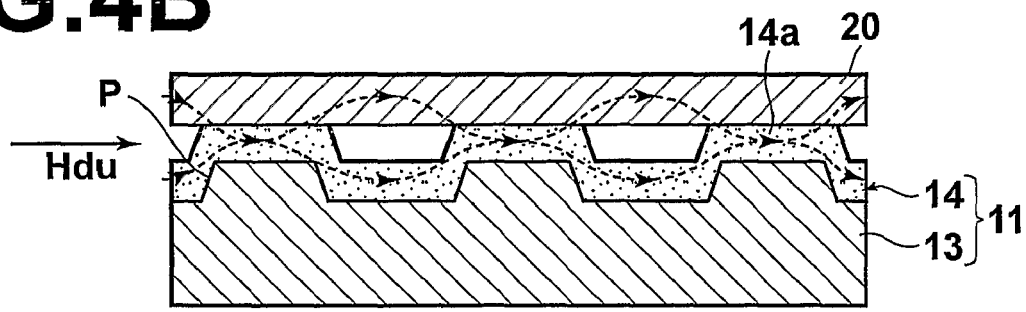

As shown in FIG. 4B, the transfer master 11 (or 12) includes, for example, a metal master substrate 13 having a microscopic land/groove pattern P on the surface according to the information to be transferred, and a magnetic layer 14 deposited along the surface configuration of the pattern P. The slave medium 20 has, for example, magnetic recording layers (not shown) on both sides.

Now, the principle of magnetic transfer will be briefly described.

In the manufacture of magnetic recording media, as shown in FIG. 4A, initial magnetization is performed beforehand on a magnetic recording layer (not shown) by the application of an initializing magnetic field $H_{in}$ to the slave medium 20 in the track or thickness direction. In FIG. 4A, the initializing magnetic field $H_{in}$ is applied in the track direction. After the initial magnetization, as shown in FIG. 4B, the slave medium 20 is brought into direct contact with the transfer master 11, and a duplicating magnetic field $H_{du}$ is applied in a direction nearly opposite to the direction of the initial magnetization. At this time, in the transfer master 11 (or 12), the duplicating magnetic field $H_{du}$ is selectively absorbed only into the lands 14a of the magnetic layer 14 that are in direct contact with the slave medium 20. As a result, in the case of in-plane magnetization, the initial magnetization of portions in direct contact with the lands 14a is not reversed and the initial magnetization of the remaining portions is reversed in the magnetic recording layer of the slave medium 20. Conversely, in the case of vertical magnetization, the initial magnetization of portions in direct contact with the lands 14a is reversed and the initial magnetization of the remaining portions is not reversed in the magnetic recording layer of the slave medium 20. In this manner, a magnetization pattern corresponding to the land/groove pattern P of the transfer master 11 (or 12) is magnetically transferred to the slave medium 20. In the case of double-side transfer, this magnetic transfer is simultaneously performed on both sides of the slave medium 20.

In this embodiment, the holder unit 2 is detachably installed on a unit base 60 provided in the transfer apparatus 1, by fixing members 61 such as bolts, etc. If the degree of insertion of each fixing member 61 into the holder unit 2 is adjusted as occasion demands, the degree of plane parallelization of the holder unit 2 can be adjusted.

As shown in FIG. 2, the holder unit 2 mainly comprises a pair of gripping members 31, 32 vertically movable toward and away from each other for holding the transfer masters 11, 12, and a pair of holding members 41, 42 for further holding the pair of gripping members 31, 32. That is, the holder unit 2 quite differs from that of the aforementioned conventional technique and is constructed such that it doubly holds the transfer masters 11, 12 and slave medium 20.

As shown in FIG. 3, in this embodiment, the transfer masters 11, 12 are stuck firmly on the gripping members 31, 32 through adhesive materials 13, such as an adhesive, double-coated tape, etc., respectively. The transfer masters 11, 12 and slave medium 20 are held with the slave medium 20 inserted between the transfer masters 11, 12. As occasion demands, an elastic member may be inserted between the transfer master 11 (12) and the corresponding gripping member 31 (32). In this case, the transfer master 11 (12) is stuck firmly on the elastic member, which is in turn stuck firmly on the gripping member 31 (32).

The inside surface of the lower gripping member 31 is provided with an insertion member 33, which is in turn inserted into the center holes of the transfer master 11 and slave medium 20. The slave medium 20 is detachably held by the insertion member 33.

In the aforementioned conventional technique (as disclosed in Japanese Unexamined Patent Publication No. 2002-163823, etc.), the positional relationship between the lower and upper transfer masters can be adjusted by performing positional adjustment between the transfer master and the gripping member, because a mechanism of holding the transfer master by air suction is adopted. In contrast to this, in this embodiment, positional adjustment between the transfer master 11 and the gripping member 31 (and between the master 12 and the gripping member 32) cannot be carried out except when they are stuck together, because the transfer masters 11, 12 are stuck firmly on the gripping members 31, 32. Therefore, the transfer apparatus 1 adopts a novel positional adjustment mechanism that will be described in detail later. However, when interchanging the transfer masters 11, 12 with different ones, it is possible to forcibly separate and remove them from the gripping members 31, 32.

An O-ring 34 is suitably provided between the facing surfaces of a pair of gripping members 31, 32 in order to hermetically seal the space between the gripping members 31, 32.

As mentioned above, the holder unit 2 is provided with a pair of holding members 41, 42 for further holding the gripping members 31, 32. The holder unit 2 is further provided with a pair of outer holding members 51, 52 for holding the inner holding members 41, 42.

The circumferential edge portions of the holding members 41, 42 are provided with a plurality of L-shaped members 43, 44 according to the shapes of the end portions of the gripping members 31, 32, respectively. The L-shaped members 43, 44 are fixed on the holding members 41, 42 by fixing members (e.g., bolts) 47, 48 so they can be tightened or loosened. In this embodiment, by gripping the end portion of the lower gripping portion 31 with the holding member 41 and L-shaped member 43 and also gripping the end portion of the upper gripping portion 32 with the holding member 42 and L-shaped member 44, the gripping member 31, 32 can be detachably held by the holding members 41, 42.

Holding bases 51, 52 are provided with a pair of push members 53 for pushing the side surfaces of the holding member 41, and a pair of push members 54 for pushing the side surfaces of the holding member 42. The push members 53 are substantially linearly aligned with each other. Similarly, the push members 54 are substantially linearly aligned with each other. The side surfaces of the holding members 41, 42 are gripped by the push members 53, 54 so that the holding members 41, 42 are installed on the holding bases 51, 52. Since push pressures can be adjusted by the push members 53, 54, the holding members 41, 42 are detachably held.

The transfer apparatus 1 is further equipped with a moving mechanism (not shown) for vertically moving the upper gripping member 32 along with the holding member 42 and holding base 52.

Positional Adjustment Mechanism

As set forth above, in this embodiment, positional adjustment between the transfer master 11 and the gripping member 31 (and between the transfer master 12 and the gripping member 32) cannot be carried out except when they are stuck together, because the transfer masters 11, 12 are stuck firmly on the gripping members 31, 32 with an adhesive. Hence, this embodiment is equipped with positional adjustment mechanism for adjusting the positional relationship between a pair of gripping members 31, 32. More specifically, this embodiment is equipped with a mechanism (A) for adjusting the positional relationship between the gripping member 32 and the holding member 42 by moving the upper gripping member 32 with respect to the holding member 42, and a mechanism (B) for adjusting the positional relationship between the holding member 41 and the holding member 51 and the positional relationship between the holding member 42 and the holding member 52.

That is, in this embodiment, the positional relationship of a pair of transfer masters 11, 12 fixed on a pair of gripping members 31, 32 is adjusted by fixing the transfer masters 11, 12 on the gripping members 31, 32 and then adjusting the positional relationship between the gripping members 31, 32.

As the aforementioned positional adjustment mechanism (A), the transfer apparatus 1 is equipped with a mechanism for performing positional adjustment of the gripping member 32 by micrometers 70. More specifically, the transfer apparatus 1 is provided with at least one pair of micrometers 70 for finely adjusting the positions at which the side surfaces of the upper gripping member 32 are pushed. The micrometers 70 are arranged substantially linearly. Positional adjustment can be carried out by making the gripping member 32 movable, pushing the gripping member 32 by the micrometers 70, and shifting the position of the gripping member 32 in a range where the gripping member 32 is not dropped from the L-shaped member 44.

The positions of the transfer masters 11, 12 at one point can be detected by a comparator, a microscope, a laser displacement gauge, a dial micrometer, etc. Therefore, by feeding back this information, the aforementioned positional adjustment can be performed by the micrometers 70. The aforementioned positional adjustment may also be performed by feeding back an eccentric level of an actually manufactured magnetic recording medium.

In this embodiment, magnetic transfer is performed by adjusting the position of the upper gripping member 32 in the aforementioned manner and then causing the slave medium 20 held by the lower gripping member 31 and the transfer master held by the upper gripping member 32 to be in direct contact with each other.

As set forth above, the transfer apparatus 1 is equipped with the positional adjustment mechanism (A) for adjusting the positional relationship between the upper gripping member and the upper holding member 42. Instead of the positional adjustment mechanism (A) or along with the positional mechanism (A), the transfer apparatus 1 can also be equipped with a mechanism (C) for adjusting the positional relationship of a pair of gripping members 31, 32 by moving the upper gripping member 32 and holding member 42 as one body.

As the aforementioned positional adjustment mechanism (B), this embodiment is equipped with a mechanism for adjusting the positional relationship between the lower holding members 41, 51 and the positional relationship between the upper holding members 42, 52 by performing, in a certain range, positional adjustment of the push members 53, 54 provided in the holding bases 51, 52.

Instead of the aforementioned mechanism, the positional adjustment mechanism (B) can adopt a mechanism for adjusting the positional relationship between the holding member 41 (42) and the holding base 51 (52), by providing only one of the two push members 53 (54) in the holding base 51 (52) and supporting the holding member 41 (42) on the holding base 51 (52) through one side surface of the holding member 41 (42) held by the one push member 53 (54).

In both constructions, once the positions of the push members 53, 54 are adjusted by the positional adjustment mechanism (B), positional reproducibility can be assured even when the holding members 41, 42 are removed and reinstalled. Therefore, if the positional relationship between the holding member 41 (42) and the holding base 51 (52) is once adjusted by the positional adjustment mechanism (B), the positional relationship between the transfer masters 11, 12 can be adjusted, by removing the holding member 41 (42) from the holding base 51 (52), performing positional adjustment of the gripping member 31 (32) to which the transfer master 11 (12) is fixed with an adhesive by an off-line operation and installing the gripping member 31 (32) on the holding member 41 (42), and reinstalling these on the holding base 51 (52) without performing positional adjustment.

Magnetic Field Application Mechanism

As set forth above, the transfer apparatus 1 is equipped with a pair of magnetic field application means 3 for applying a magnetic field to the transfer masters 11, 12 and slave medium 20 held by the holder unit 2. The two magnetic field application means 3 comprise electromagnetic coils, permanent magnets, etc. and are nearly symmetrically arranged on the upper and lower sides of the holder unit 2.

In this embodiment, the interiors of the gripping members 31, 32 and holding members 41, 42, which constitute the holder unit 2, are provided with magnetic field application means inserting portions 35, 36, 45, and 46, into which at least one portion of each of the two magnetic field application means 3 is inserted.

In this embodiment, the magnetic field application means inserting portions 45, 46 comprise through openings formed in the holding members 41, 42, respectively. The magnetic field application means inserting portions 35, 36 comprise recesses formed in the gripping members 31, 32, respectively.

The transfer masters 11, 12 and slave medium 20 held by the holder unit 2 are positioned nearly coaxially with the magnetic field application means inserting portions 35, 36, 45, and 46.

The holding bases 51, 52 are provided with similar magnetic field application means inserting portions 55, 56, respectively.

The transfer apparatus 1 is further equipped with means (not shown) for vertically moving the upper and lower magnetic field application means 3 and means (not shown) for rotating the upper and lower magnetic field application means 3 with at least one portion of each of the upper and lower magnetic field application means 3 inserted in the magnetic field application means inserting portions 35, 36, 45, and 46.

In the transfer apparatus 1, magnetic transfer is performed, by inserting at least one portion of each of the upper and lower magnetic field application means 3 into the magnetic field application means inserting portions 35, 36, 45, 46, 55, and 56, moving the two magnetic field application means 3 close to the magnetic masters 11, 12 and slave medium 20, and rotating the two magnetic field application means 3 with the holder unit 2 being fixed.

In magnetic transfer, the stoppage of magnetic field application by a pair of magnetic field application means 3 are carried out at the same time. In addition, it is preferable to simultaneously carry out the start of magnetic field application by the two magnetic field application means 3.

The transfer apparatus 1 of this embodiment is constructed as described above.

Method of Manufacturing a Transfer Medium

Now, a method of manufacturing a magnetic recording medium by employing the aforementioned transfer apparatus 1 will be described as a method of manufacturing a transfer medium according to this embodiment.

(Step 1)

In the manufacture of a magnetic recording medium, transfer masters 11, 12 are firmly stuck beforehand on the gripping members 31, 32 through adhesive materials 13. As set forth above, the adhesive materials 13 may use adhesives, double-coated tape, etc. Examples of adhesives are an air-hardening adhesive, a thermosetting adhesive, a light-hardening adhesive, 2-agent mixed adhesive, a reactive adhesive that reacts with water in the ambient atmosphere, an anaerobic adhesive, and so forth. Adhesion conditions are suitably determined according to the type of adhesive used. Examples of methods of coating adhesives are a spin-coat method, a dispensing method, etc. Examples of double-coated tape are tape itself having stickiness (no base material), tape having adhesive layers on both sides of a base material having no stickiness, etc.

The aforementioned adhesion is preferably performed under reduced pressure (e.g., 20 kPa or less) so that there are no atmospheric gases or foreign substances between the transfer masters 11, 12 and the gripping members 31, 32. At this time, it is preferred to protect the surfaces of the transfer masters 11, 12 with film so that there are no foreign substances on the surfaces of the transfer masters 11, 12.

The transfer apparatus 1 does not need to perform strict alignment when fixing the transfer masters 11, 12 and gripping members 31, 32 with an adhesive, because it is equipped with the positional adjustment mechanism for adjusting the positional relationship between the gripping members 31, 32. However, alignment may be performed as occasion demands.

(Step 2)

Initially, the holding members 41, 42 are fixed to the holding bases 51, 52, respectively. At this time, the positional relationship is adjusted between the holding member 41 and the holding base 51 and between holding member 42 and the holding base 52 by the positional adjustment mechanism (B).

Next, the gripping members 31, 32 are installed on the holding members 41, 42 and are fixed by the L-shaped members 43, 44. At this time, it is preferable to remove the holding members 41, 42 from the holding bases 51, 52, install the gripping members 31, 32 on the holding members 41, 42 by off-line operation, and reinstall these on the holding bases 51, 52 without performing positional adjustment.

(Step 3)

Next, the lower part 4 of the holder unit 2, comprising the holding base 51, holding member 41, and gripping member 31 (which has the transfer master 11 stuck thereon), is installed on the unit base 60 and fixed by a fixing member 61. On the other hand, the upper part 5 of the holder unit 2, comprising the holding base 52, holding member 42, and gripping member 32 (which has the transfer master 12 stuck thereon), is separated away from the lower part 4 and installed in the transfer apparatus 1.

(Step 4)

Next, the slave medium 20 to which a magnetic field is applied beforehand in a predetermined direction, as shown in FIG. 4A, is supplied onto the transfer master 11 stuck on the gripping member 31. The position of the slave medium 20 is suitably adjusted according to the insertion member 33, positioning pins provided as necessary, etc.

(Step 5)

Next, the positional relationship between the lower part 4 and upper part 5 of the holder unit 2 is adjusted by the positional adjustment mechanism (A). More specifically, by loosening the L-shaped member 44 fixed to the holding member 42 of the upper part 5 to make the gripping member movable, the position of the gripping member 32 is adjusted by the micrometers 70. This adjusts the positional relationship between a pair of gripping members 31, 32, so that the positional relationship between the transfer masters 11, 12 is adjusted.

(Step 6)

After the positional adjustment has been performed as described above, the upper part 5 of the holder unit 2 is lowered to the lower part 4. At this time, the transfer mater 12 is brought into direct contact with the slave medium 20.

(Step 7)

Next, a pair of magnetic field application means 3 are inserted in the magnetic field application means inserting portions 35, 36, 45, 46, 55, and 56 and rotated. As a result, a magnetic field is applied to the transfer masters 11, 12 and slave medium 20 held by the holder unit 2, as shown in FIG. 4B. In this manner, magnetic transfer is performed and a magnetic recording medium (transfer medium) is manufactured.

When finishing magnetic transfer, the stoppage of magnetic field application by the pair of magnetic field application means 3 are simultaneously carried out. If the stoppage of magnetic field application by the two magnetic field application means 3 are not simultaneously carried out, there is a possibility that an unnecessary magnetic field will be applied to the transfer masters 11, 12 and slave medium 20 in the vertical direction and have an adverse influence on the transfer of magnetic information.

Although it is particularly vital to simultaneously carry out the stoppage of magnetic field application by the pair of magnetic field application means 3, it is most preferable that the two magnetic field application means 3 be simultaneously carried out in all operations. That is, it is most preferable to simultaneously carry out the rotation starts of the two magnetic field application means 3, start of magnetic field application by the two magnetic field application means 3, stoppage of magnetic field application by the two magnetic field application means 3, and rotation stoppage of the two magnetic field application means 3.

It is further preferable to synchronously rotate a pair of magnetic field application means 3 so that the phases in the circumferential direction of the transfer masters 11, 12 and slave medium 20 become nearly equal, and so that the magnetic field intensities applied to both sides of the slave medium 20 become nearly equal.

(Step 8)

When performing magnetic transfer on a plurality of slave media 20 by employing the magnetic masters 11, 12, the lower part 4 and upper part 5 of the holder unit 2 are separated from each other, a manufactured magnetic recording medium is taken out, and step 4 and subsequent steps are repeated. In the second magnetic transfer and subsequent magnetic transfers, it is not necessary to perform positional adjustment. However, positional adjustment may be performed again as occasion demands.

In the case of interchanging the transfer masters 11, 12 with different ones, they are forcibly detached from the gripping members 31, 32, and step 1 and subsequent steps are repeated. Using different gripping members 31, 32, step 1 and subsequent steps may also be repeated.

The holder unit 2 of this embodiment and the transfer apparatus 1 equipped with the holder unit 2 are constructed such that the transfer masters 11, 12 are stuck firmly on a pair of gripping members 31, 32. Therefore, the gripping members 31, 32 can dispense with the mechanism for holding transfer masters by air suction, so that they can be made significantly thinner, compared with the aforementioned conventional technique.

Because the degree of plane parallelization and plane smoothness of the transfer masters 11, 12 and slave medium 20 can be corrected to some degree by the adhesive materials 13 with which the transfer masters 11, 12 are stuck firmly on the gripping members 31, 32, the accuracy of the flatness and thickness of the transfer masters 11, 12 and slave medium 20 is not so strict as that in the aforementioned conventional technique. Thus, a reduction in cost of the transfer apparatus 1 and magnetic recording medium (transfer medium) can be achieved.

If the transfer masters 11, 12 are stuck firmly on the gripping members 31, 32, positional adjustment between the transfer master 11 (12) and the gripping member 31 (32) cannot be carried out except when the transfer masters 11, 12 are stuck on the gripping members 31, 32. However, the aforementioned embodiment is capable of performing positional adjustment between the transfer masters 11, 12 by providing the positional adjustment mechanism for adjusting the positional relationship between a pair of gripping members 31, 32.

More specifically, in order to perform positional adjustment, the aforementioned embodiment adopts a structure for doubly holding the transfer masters 11, 12 and slave medium 20 by providing a pair of holding members 41, 42 for detachably holding a pair of gripping members 31, 32, and also adopts the mechanism (A) for adjusting the positional relationship between the upper gripping member 32 and the holding member 42, etc.

Thus, this embodiment is capable of carrying out positional adjustment satisfactorily and performing magnetic transfer satisfactorily, while assuring the aforementioned effect of making the gripping members 31, 32 thinner.

In the aforementioned embodiment, the positional adjustment mechanism (A) is adopted only for the upper gripping member 32. However, the positional adjustment mechanism (A) may be adopted for at least one of the two gripping members 31, 32.

If the holder unit 2 has a double structure, the entire thickness of the holder unit 2 is increased. However, in the aforementioned embodiment, the gripping members 31, 32 and holding members 41, 42 are provided with magnetic field application means inserting portions 35, 36, 45, 46 into which at least one portion of each of the two magnetic field application means 3 is inserted, so that the two magnetic field application means 3 can be moved close to the transfer masters 11, 12 and slave medium 20 held by the gripping members 31, 32.

Thus, there is no possibility that the presence of the holding members 41, 42 will reduce the advantage of making the gripping members 31, 32 thin. In addition to making the entire gripping members 31, 32 thin, the portions of the gripping member 31, 32 to which a magnetic field is applied can be made thinner by providing the magnetic field application means inserting portions 35, 36. Therefore, as compared with the aforementioned conventional technique, a pair of magnetic field application means 3 can be moved very close to the transfer masters 11, 12 and slave medium 20. For this reason, even in the case of manufacturing a magnetic recording medium relatively smaller in diameter, a magnetic field can be satisfactorily applied.

Considering the thinning of the portions of the gripping members 31, 32 to which a magnetic field is applied, it is most preferable to provide the magnetic field application means inserting portions in all of the gripping members 31, 32 and holding members 41, 42, but the magnetic field application means inserting portions may be provided in at least either one or the other of the gripping members 31, 32 and/or at least either one or the other of the holding members 41, 42.

The transfer apparatus 1 is constructed such that it is provided with means for rotating the magnetic application means 3. This renders it possible to perform magnetic transfer, with the transfer masters 11, 12 and slave medium 20 being fixed. Therefore, the holder unit 2 can be made structurally simple, compared with the case of rotating the holder unit 2.

According to the transfer apparatus 1 of this embodiment and the manufacturing method that uses this apparatus 1, a magnetic field can be applied to the transfer masters 11, 12 and slave medium 20 at close range, so a magnetic recording medium of high transfer accuracy can be manufactured compared with the aforementioned conventional technique.

While the present invention has been described with reference to the preferred embodiment thereof, the invention is not to be limited to the details given herein, but may be modified within the scope of the invention hereinafter claimed.

Although double-side transfer has been described, the present invention is likewise applicable to one-side transfer. In the case of one-side transfer, a single transfer master is used, and is stuck firmly on one of the gripping members 31, 32. In this case, the other gripping member not holding the transfer master is provided with an elastic material, which may be stuck firmly on the gripping member. Even such a construction is able to perform positional adjustment satisfactorily by applying the mechanisms of the aforementioned embodiment.

The manner in which the slave medium 20 is held by the gripping members 31, 32, the manner in which the gripping members 31, 32 are fixed by the holding members 41, 42, the manner in which the holding members 41, 42 are fixed by the holding bases 51, 52, positional adjustment mechanisms, etc., can be changed as appropriate.

The present invention can be suitably applied to magnetic transfer apparatuses used in manufacturing magnetic recording media, but is also applicable to transfer apparatuses that have a transfer master and a slave medium in direct contact with each other and transfer information such as magnetic information, shapes, etc.

The present invention can be suitably applied to transfer techniques, such as magnetic transfer, nanoimprining, patterned media, which cause a transfer master with a predetermined land/groove pattern to be in direct contact with a slave medium and transfer information such as magnetic information corresponding to the land/groove pattern, shapes of land/groove patterns, etc.

The invention claimed is:

1. A holder unit for use in a transfer apparatus that causes a surface of a transfer master and a surface of a slave medium to be in direct contact with each other and transfers information on the transfer master surface to the slave medium surface, said holder unit comprising:
   a pair of gripping members, movable toward and away from each other, for holding said transfer master; and
   a pair of holding members for respectively holding said pair of gripping members detachably;
   wherein said transfer master is stuck firmly on either or both of said pair of gripping members through or without an elastic member, and
   wherein at least one of said pair of gripping members and said pair of holding members is provided with magnetic field application means inserting portions into which at least one portion of magnetic field application means is inserted to apply a magnetic field to said transfer master and said slave medium.

2. The holder unit as set forth in claim 1, further comprising a pair of holding bases for respectively holding said pair of holding members detachably.

3. A transfer apparatus comprising:
   the holder unit as set forth in claim 2; and
   a positional adjustment mechanism for adjusting the positional relationship between said pair of gripping members;
   wherein said positional adjustment mechanism includes a mechanism for adjusting the positional relationship between at least one of said pair of holding members and said holding base corresponding to said one holding member.

4. A transfer apparatus comprising the holder unit as set forth in claim 1.

5. The transfer apparatus as set forth in claim 4, further comprising a positional adjustment mechanism for adjusting the positional relationship between said pair of gripping members.

6. A method of manufacturing a transfer medium by use of the transfer apparatus as set forth in claim 4, said method comprising the steps of:
   holding said transfer master by said pair of gripping members;
   adjusting the positional relationship between said pair of gripping members; and
   performing transfer.

7. A transfer apparatus comprising:
   the holder unit as set forth in claim 1; and
   a positional adjustment mechanism for adjusting the positional relationship between said pair of gripping members;
   wherein said positional adjustment mechanism includes a mechanism for adjusting the positional relationship between at least one of said pair of gripping members and said holding member corresponding to said one gripping member.

8. A transfer apparatus comprising:
   the holder unit as set forth in claim 1;
   magnetic field application means for applying a magnetic field to said transfer master and said slave medium; and
   rotation means for rotating said magnetic field application means, with at least one portion of said magnetic field application means inserted in said magnetic field application means inserting portions.

9. The transfer apparatus as set forth in claim 8, wherein said magnetic field application means comprises a pair of magnetic field application units for applying a magnetic field to both sides of said transfer master and slave medium held in direct contact with each other.

10. A method of manufacturing a transfer medium by use of the transfer apparatus as set forth in claim 9, said method comprising the steps of:
    arranging said pair of magnetic field application means nearly symmetrically on both sides of said transfer master and said slave medium and then performing magnetic transfer; and
    carrying out stoppage of the magnetic field application of said pair of magnetic field application means at the same time.

* * * * *